United States Patent [19]

Verbrugge et al.

[11] Patent Number: 4,889,074
[45] Date of Patent: Dec. 26, 1989

[54] MOVABLE ACCOMODATION OR CONTAINER IN WHICH IS ARRANGED APPARATUS FOR AUTOMATIC MILKING OF AN ANIMAL

[75] Inventors: Jeroen K. J. Verbrugge, Delft; Erik A. Aurik, Amsterdam, both of Netherlands

[73] Assignee: Multinorm B.V., Nieuw-Vennep, Netherlands

[21] Appl. No.: 121,341

[22] Filed: Nov. 16, 1987

[30] Foreign Application Priority Data

Nov. 19, 1986 [NL] Netherlands .......................... 8602942

[51] Int. Cl.$^4$ .............................................. A01J 5/00
[52] U.S. Cl. .................................................. 119/14.03
[58] Field of Search ............... 119/14.02, 14.03, 14.08, 119/14.04, 27

[56] References Cited

U.S. PATENT DOCUMENTS

| | | | |
|---|---|---|---|
| 3,810,442 | 5/1974 | Jacobs et al. ................. | 119/14.04 X |
| 3,828,733 | 8/1974 | Correia .............................. | 119/14.03 |
| 4,000,718 | 1/1977 | Brown .............................. | 119/14.03 |
| 4,194,467 | 3/1980 | Nielsen et al. ................... | 119/14.03 |
| 4,292,927 | 10/1981 | Sassmann ............................. | 119/16 |
| 4,508,058 | 4/1985 | Jakobson et al. ................ | 119/14.02 |
| 4,617,876 | 10/1986 | Hayes .............................. | 119/20 X |
| 4,805,557 | 2/1989 | van der Lely et al. .......... | 119/14.08 |

Primary Examiner—Robert P. Swiatek
Attorney, Agent, or Firm—Watson, Cole, Grindle & Watson

[57] ABSTRACT

A movable accommodation in which animals can be automatically milked includes a shelter, bar fences mounted in the shelter to define two milking locations in which animals to be milked can be individually contained, milking racks with teat cups respectively located adjacent the two milking locations, and a robot which is movable back and forth along guide beams that extend between the two milking locations and which operates to position the respective milking racks in operative position relative to the teats of an animal in the adjacent milking location.

8 Claims, 8 Drawing Sheets

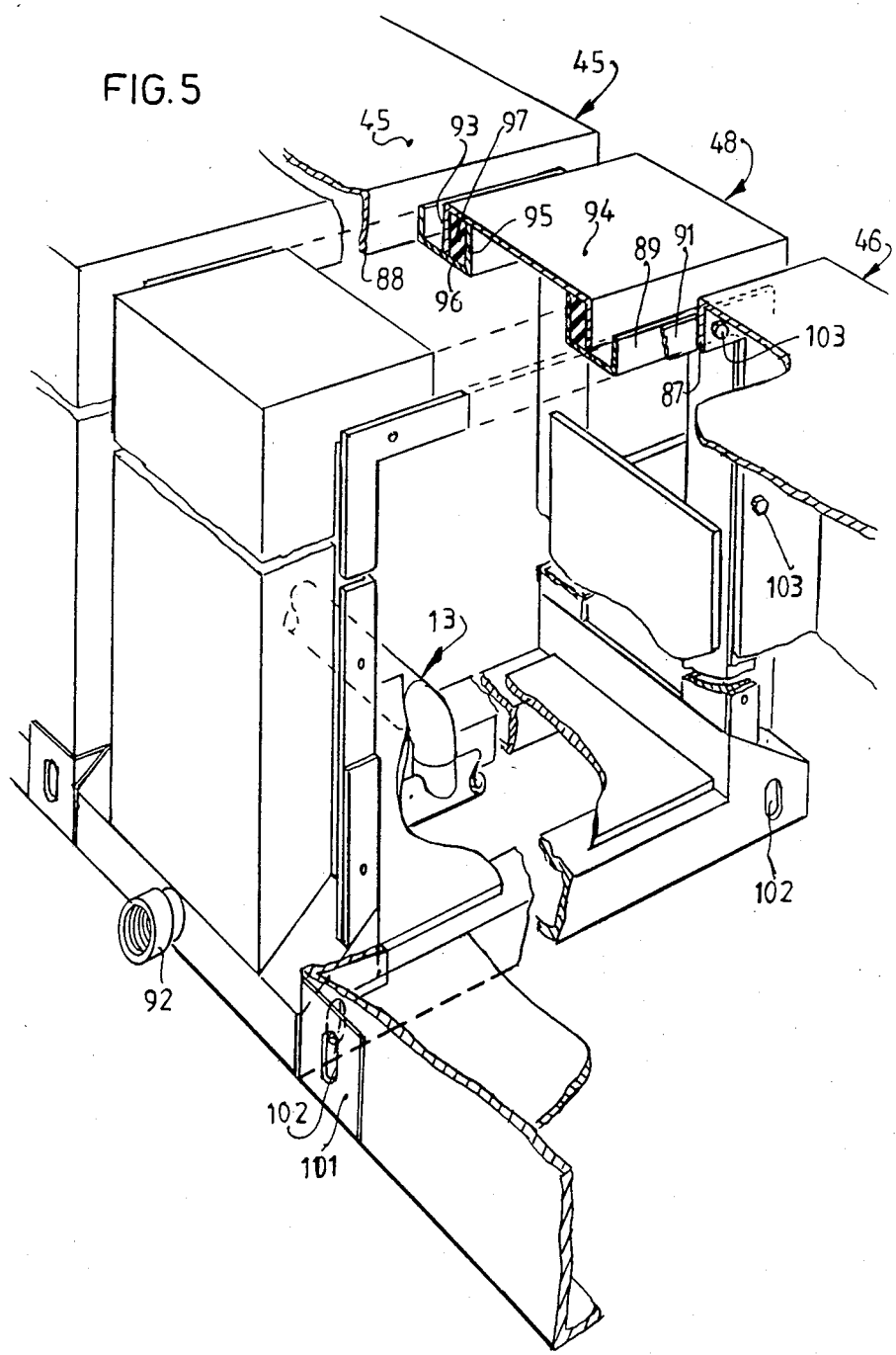

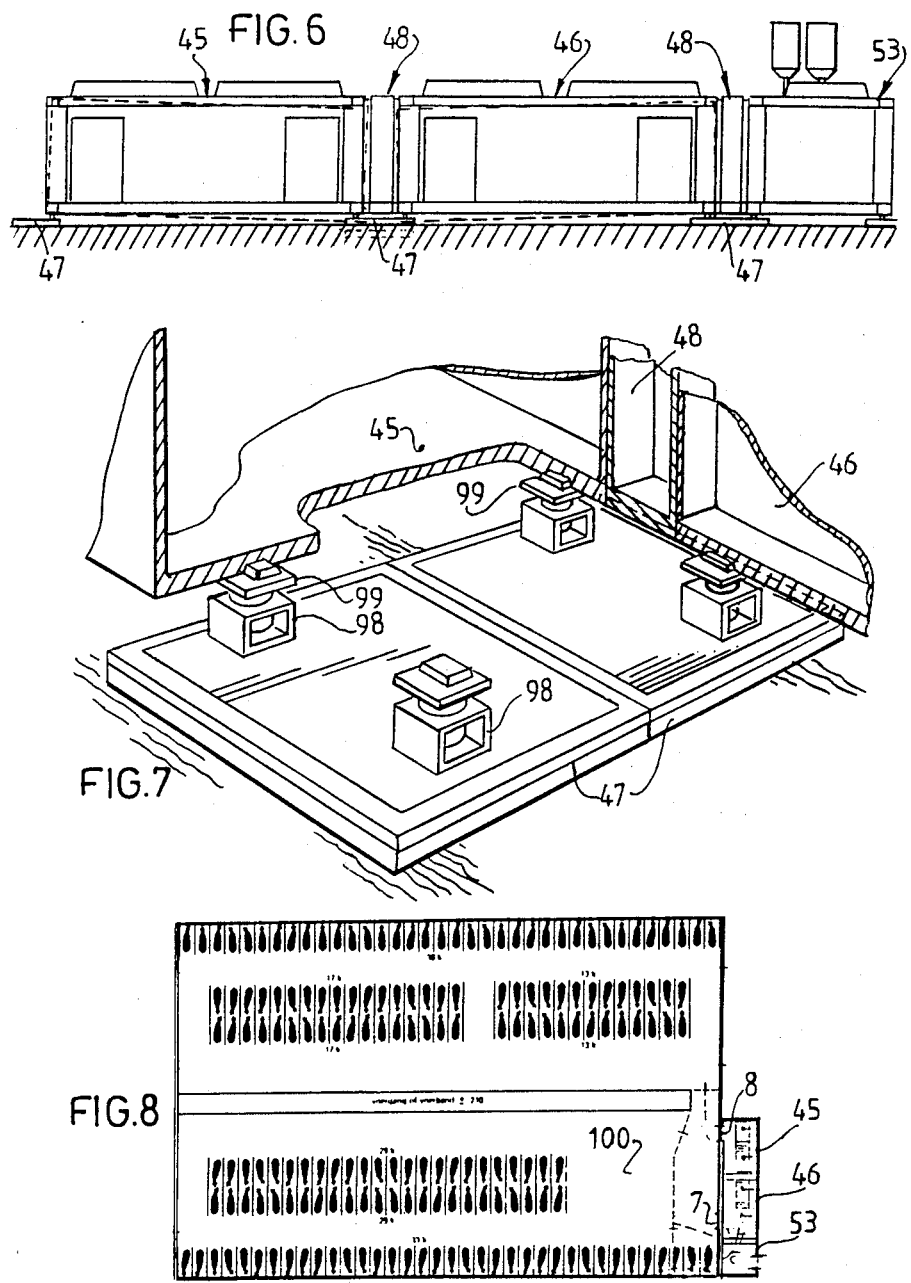

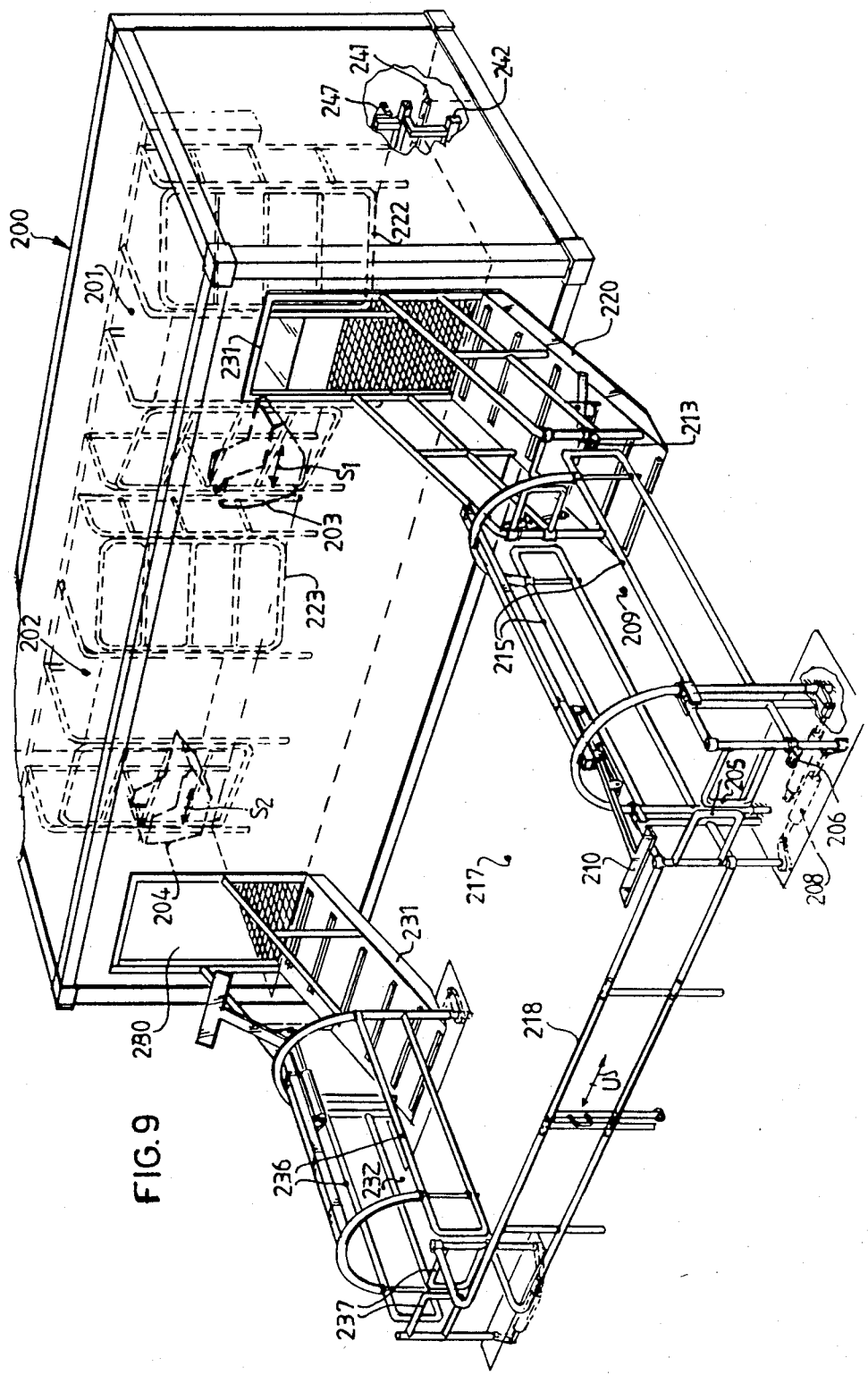

MOVABLE ACCOMODATION OR CONTAINER IN WHICH IS ARRANGED APPARATUS FOR AUTOMATIC MILKING OF AN ANIMAL

For some considerable time now a usable form has been sought for automatic milking of (female) animals or cattle, for example cows, which can be adapted to differing forms of cattle farming.

An object of the present invention is to provide a movable milking location, whereby the milking of cows is as far as possible carried out automatically.

Also for this reason the movable accommodation according to the invention is provided with at least one exit and/or entrance opening for allowing an animal in and out of the movable container, with means for leading to and keeping in its place an animal to be allowed into the movable accommodation and with an apparatus for automatic milking of an animal.

The movable accommodation according to the invention can in simple manner be placed in a meadow as well as with its opening next to an existing cowshed or therein, whereby the cattle can then walk out of the shed directly into the movable accommodation. As a consequence the milking location can be mass produced according to the invention, whereby, depending on the local situation, modifications can be made, without it being necessary to make an entirely separate design for an automatic milking apparatus for each cattle farm.

The movable or transportable accommodation can easily be moved or transported by road, rail or ship via normal or standardized transporting means.

In another preferred embodiment of the invention, it is possible to use the movable accommodation in areas with varying outside temperatures and differing climates, at outdoor temperatures ranging between $+40°$ and $-40°$. The inside temperature of the movable accommodation will then normally amount to between $+4°$ and $+20°$; heating means will if required have to be used to achieve that the temperature inside the movable accommodation remains above freezing point $0°$ C. Glass fibre reinforced polyester is for instance used as the inner and the outer skin of insulating sandwich panels, between which is placed PUR foam.

With the preferred embodiment, when an animal enters the movable accommodation it is recognised and via a process control is ensured that for example a sick animal is not milked or that an animal that has been milked shortly before is not milked again.

In the preferred embodiment, only one expensive mobile milking robot need to be used for two milking locations in the movable accommodation.

In the preferred embodiment provisions are made for collection and disposal of the manure to be produced by the animals, in order to preserve the hygienic environment in the container.

Further the present invention provides a lock area to such an accommodation and a movable arm to an automatic milking apparatus.

According to the preferred embodiment the controlling of a movable arm between two milking locations is easily performed.

PRIOR ART

The European patent application 0.091.892 discloses a milking robot to be used with a rotation platform for a number of cows, i.e. five. However, this arrangement is so sizable that it is practically impossible to make it transportable.

U.S. Pat. No. 3,019,763 discloses a cow shed which is totally transportable.

The article "Neuheiten zur Milchgewinnung und-lagerung" from Landtechnik, vol. 41, No. 7/8, 1986 of W. Weber describes developments in milking techniques. New management techniques for milk recording and responder feeding are disclosed.

Further features, advantages and details of the current invention will be elucidated with reference to the accompanying drawings.

BRIEF DESCRIPTION OF THE DRAWINGS

FIG. 4 is an enlarged, partly broken away perspective view of detail IV from FIG. 3;

FIG. 5 shows on a larger scale a partly broken away perspective view of detail V from FIG. 3;

FIG. 6 is a side view of the preferred embodiment from FIG. 3;

FIG. 7 shows in more detail and partly broken away the detail VII from FIG. 3;

FIG. 8 shows an embodiment as according to FIG. 3 positioned close to a milking shed;

FIG. 9 shows another perspective view of another preferred embodiment of the movable accommodation according to the present invention;

DETAILED DESCRIPTION OF THE PREFERRED EMBODIMENTS

Figure 1:
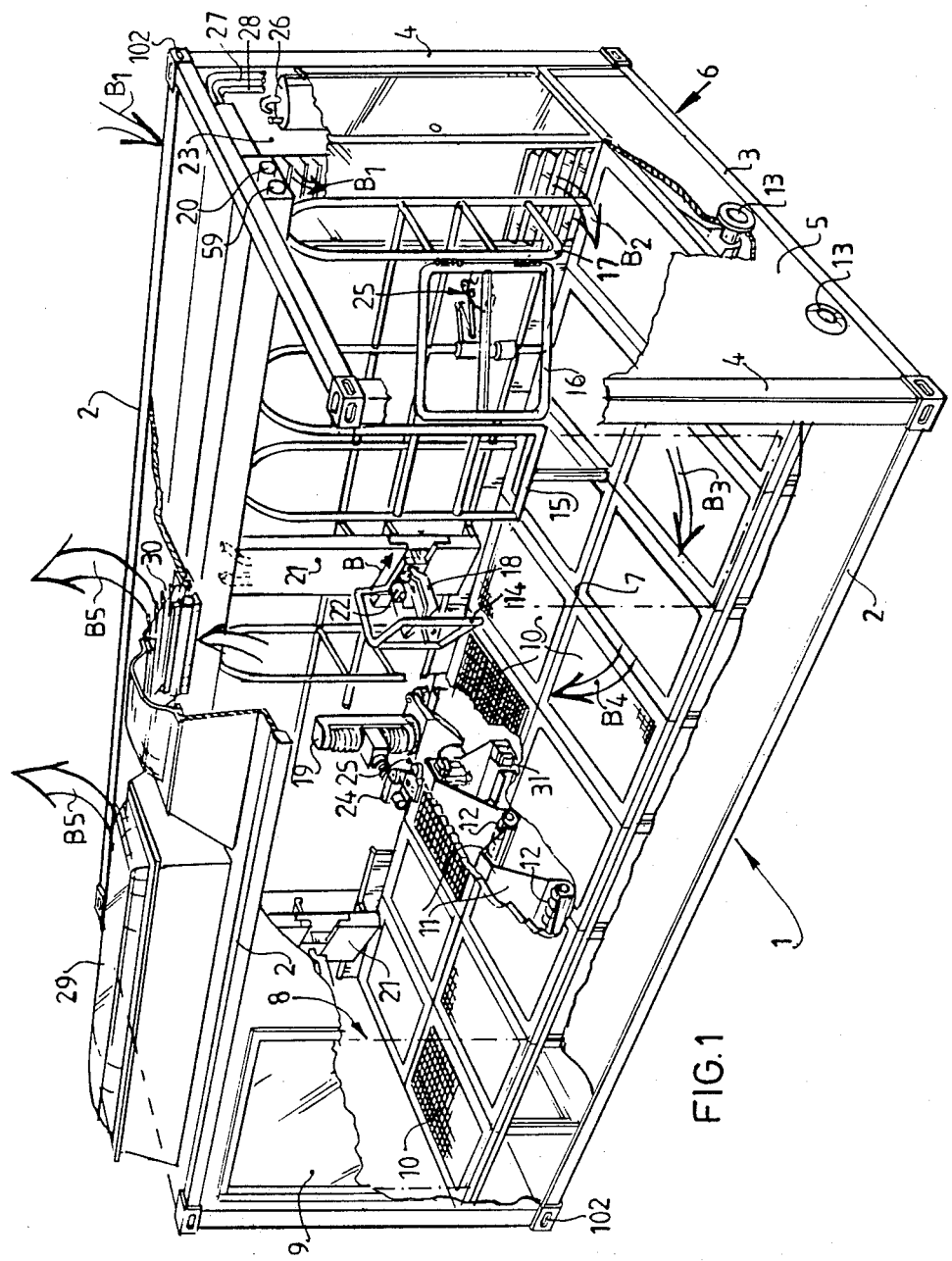
FIG. 1 shows a partly broken away perspective view of an embodiment of the movable accommodation according to the invention.

A preferred embodiment of a movable accommodation or container according to the invention (FIG. 1) is constructed from horizontal beams 2 and 3 and uprights 4—together forming a frame 6—between which are arranged sandwich panels 5 which are built up for instance of glass fibre-reinforced polyester with PUR foam between, so that the panels are impact resistant, insulating and can easily be cleaned via a sprinkler installation (not shown). The sandwich panels are preferably removable, as will be discussed later. Arranged on the long side, the dimension of which preferably amounts to approximately six metres, are an entrance opening 7 and an exit opening 8 for the cows, which openings can be closed off with doors 9, only one of which is shown.

Laid on the floor over which the cows will walk are gratings 10, under which are arranged bins that are V-shaped in section for collecting manure. The manure is carried away via worm wheels 12 to manure discharges 13 which are connected in a manner not shown to a tank or hose.

The means for leading to and keeping in its place a cow to be brought into the container via entrance opening 7 are formed by bar fences 14, 15, 16 and 17 to be opened and closed automatically. The fence 16 is for instance opened via control means (not shown) for allowing the cow to enter, whereby the bar fence 14, to which is attached a feed trough 18 for supplying concentrated feed to the cow, has already been moved in the direction of the arrow B into a position such that the cow fits precisely in the enclosure formed by the bar fences 14, 15, 16 and 17. By adjusting the bar fence at the front of the cow near the feed trough the udders of the cows of differing sizes will always be located roughly in the same position relative to the longitudinal fence 15, which is advantageous with respect to applying of the milking cup. The bar fences 14, 15, 16 and 17 form a first location and such a milking location is formed in the same way close to a milking robot 19, but for the sake of clarity the bar fences here are largely omitted.

The feed trough 18 is supplied with the correct quantity of concentrated feed via feed lines 20 and 59, which run out via guidings 21 and an outlet 22 into feed troughs 18. Feed lines 20, 59 are for example connected to silos situated in a space 23. The robot 19 is provided with an arm 24 movable in three dimensions which can grip onto milking racks 25 always located close to the udder and which can be moved between the milking locations. Also accommodated in space 23 is a milk tank 26 which is connected via lines 27 and 28 to milking racks 25. Also accommodated in space 23 is the vacuum equipment for the milking. An energy source may also be located in space 23, but container 1 can also be supplied with external energy. Arranged on the top of the container are cupola skylights 29 which are removable, so that identical containers 1 can be stacked onto one another.

Further accommodated in space 23 is a ventilation system, whereby air is drawn in via arrow $B_1$ and then, via arrows $B_2$, $B_3$, $B_4$, once more leaves the container via ventilation openings located in the skylights, as indicated schematically with arrow $B_5$. The air circulation as shown schematically by the arrows $B_1$–$B_5$ can also be heated and cooled in accordance with the outside conditions and the conditions required inside.

Figure 2:
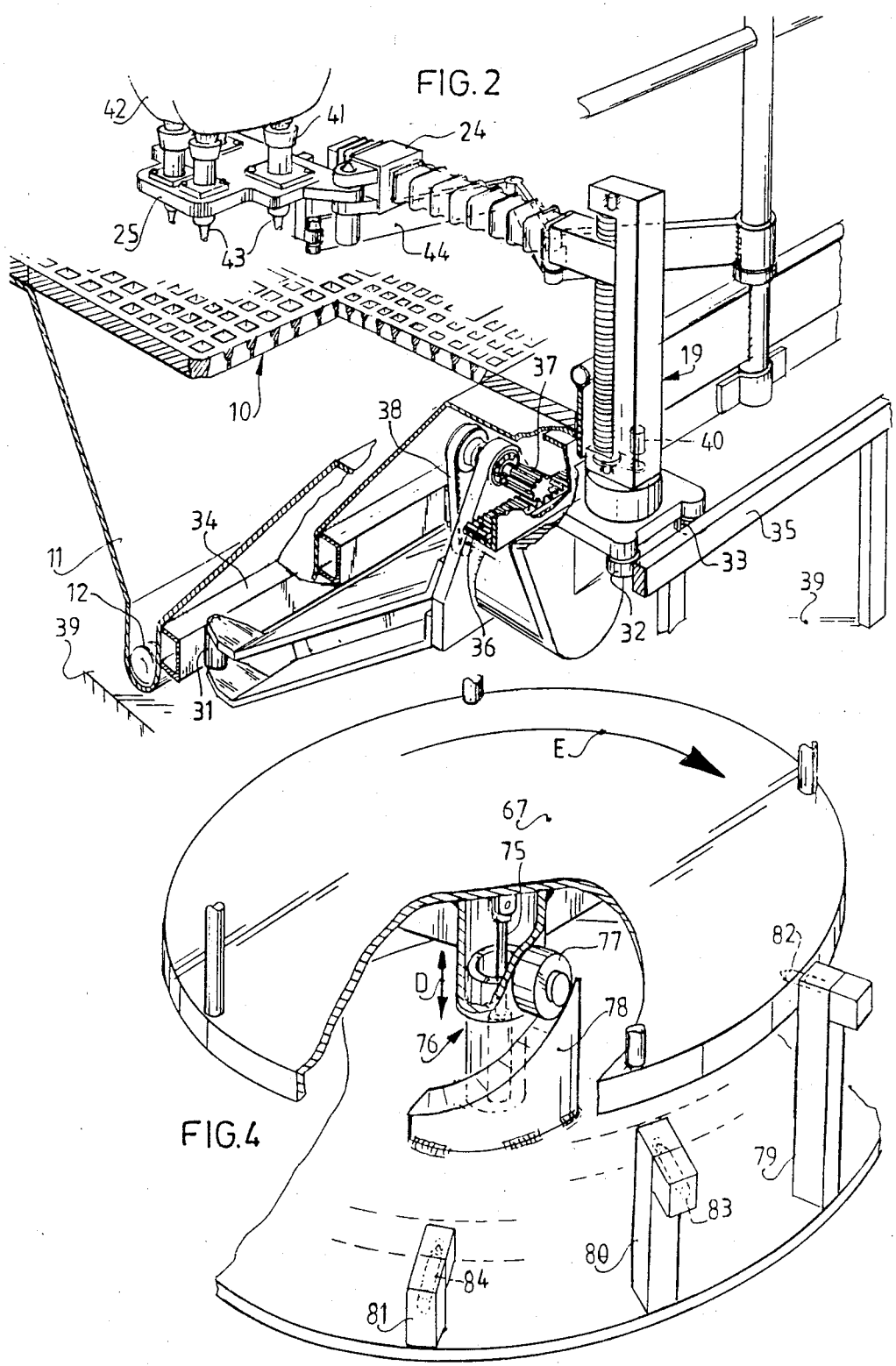
FIG. 2 shows on a larger scale a partly broken away perspective view of the robot arm from FIG. 1, which arranges a milking cluster close to the udder of an animal.

In a preferred embodiment the guiding of the milking robot 19 (FIG. 2) is located as far as possible beneath the gratings 10 fitted at a slightly elevated level, and consists of rollers 31 together with rollers 32 and 33 which run against the horizontal beams 34 and 35 respectively, in addition to a driven gear wheel 37 running in a gear rack 36, the wheel being connected via a drive belt 38 with an electric motor (not shown).

As a result of the guiding via a gear rack 36 and gear wheel 37 which is coupled in a manner not shown to the process control, the exact position of milking robot 19 is known with this process control.

Since the guiding is accommodated as far as possible under gratings 10 walking space 39 for the farmer is available behind the milking robot 19.

The arm 24 of milking robot 19 can be moved in three dimensions via controls, one of which is designated schematically with 40, in order to carry the milking rack 25 that is provided with four milking cups 41 for the teats of a cow into the correct position relative to an udder 42 of a cow. After the teat cups 41 have been positioned correctly relative to an udder 42 and have been fitted to the teats, the arm 24 is disconnected from the milking rack 25 and the robot 19 is sent automatically to the other milking location in container. 1, in order to provide a cow positioned there with a similar milking rack. After milking has been performed via the only partially shown lines 43, the teat cups 41 are disconnected and milking rack 25 is pulled aside automatically via a concertina arm 44. After milking the teat cups are cleaned, for which purpose means (not shown) are located near the milking racks.

Arranged at each location is a detector (not shown) for detecting a cow at that position.

In another embodiment (FIG. 3) two containers 45 and 46 are placed on foundation plates 47 and interconnected via a coupling piece 48. Formed as a result are four milking locations 49, 50, 51 and 52, between which the costly milking robot 19 is displaceable. Likewise coupled to foundation plates 47 via a connecting piece 48 is a somewhat smaller container 53 in which storage tanks 54 and 55, for example for milk, as well as control equipment 56 for controlling the process can be accommodated. Tanks 54 are coupled for example in a manner not shown to the discharge lines of the milking racks (not shown), while arranged above the container 53 are silos 57 and 58 for storage of concentrated feed, which are connected via lines 50 and 61 with the feed troughs 18. The farmer 62 can enter the walking area 39 via a door 63. To provide the farmer 62 with a good view the wall 64 is preferably transparent and replaces the wall panels on the end section of the container, which are removable.

When a cow observes that it is going to be milked it will come of itself to a ramp 65, whereby it will pass a recognition unit 66 which will recognize it as it passes through, so that it will be apparent when it reaches the rotary table 67 of an access lock area 68 whether it may pass through barrier 69 which is controlled automatically by recognition unit 66. If the cow that has arrived on rotary table 67 has to be milked, the barrier 69 will swing away upward and the cow will be forced by the pusher unit 70 into container 46. Pusher unit 70 consists of a cylinder 71 having a shaft 72 slidable therein, which shaft is connected at pin 73 for pivoting with a fence part 74. Fence part 74 can therefore pivot in the direction of arrow C, so that a cow can move onto rotary table 67.

The rotary table 67 (FIG. 4) rests on a shaft 75 of a gas spring 76 and can thus be moved in the direction of the arrow D, during which movement there takes place a movement in the direction of arrow E as a result of the presence of wheel 77 running relative to a guiding 78. Rotary table 67 can be blocked in three different positions by pins 82, 83 and 84 which can slide out of posts 79, 80 and 81 resp. Depending on the information obtained by the recognition unit 66 from the cow, the latter is either admitted into container 46 (FIG. 3) or led away via exit ramp 85 or exit ramp 86. Exit ramp 85 leads for example to an area for receiving sick cows, while ramp 86 returns the cow to the shed or meadow. Pins 82, 83 and 84 are actuated electrically from the recognition unit 66 or the control equipment 56. Following removal of the cow the rotary table is returned automatically to its highest position by the compression spring 76.

The connecting piece 48 between containers 45 and 46 (FIG. 5) is attached to containers 45 and 46 with bolts 103, whereby located between flanges 87 and 88 of the container and flanges 89 and 90 of the connecting piece is a strip of sealing material 91. The container 45 is provided with a discharge line 13 which leads to a manure discharge line below the connecting piece 48 and having a manure discharge connection 92. Should a foundation place 47 under the connecting piece 48 subside, as is shown in FIG. 6 with broken lines, a quantity of flexible material 97 accommodated at the top of the connecting piece 48 between a flange 93 of an upper plate 94 and a flange 95 of a U-shaped profile 96 will be pressed together, while a like quantity of material at the bottom will expand. In this way the connecting piece 48 can absorb settling of the foundation plates om addition to enabling the placing of two containers coupled together on slightly uneven ground.

The base plates 47 are provided with counter supports 98 which accommodate feet 99 of the containers (FIG. 7). The counter supports are preferably height adjustable, so that should subsidence occur they can again be adjusted in the height.

If a cow from a shed 100 (FIG. 8) is going to be milked, it will automatically walk to the entrance of container 46, where it will be provided by the robot with a milking cluster at one of the four milking locations, after which it will be milked mechanically, then leaving the container 45 via exit opening 8 and return to its place in the shed.

Figure 3:
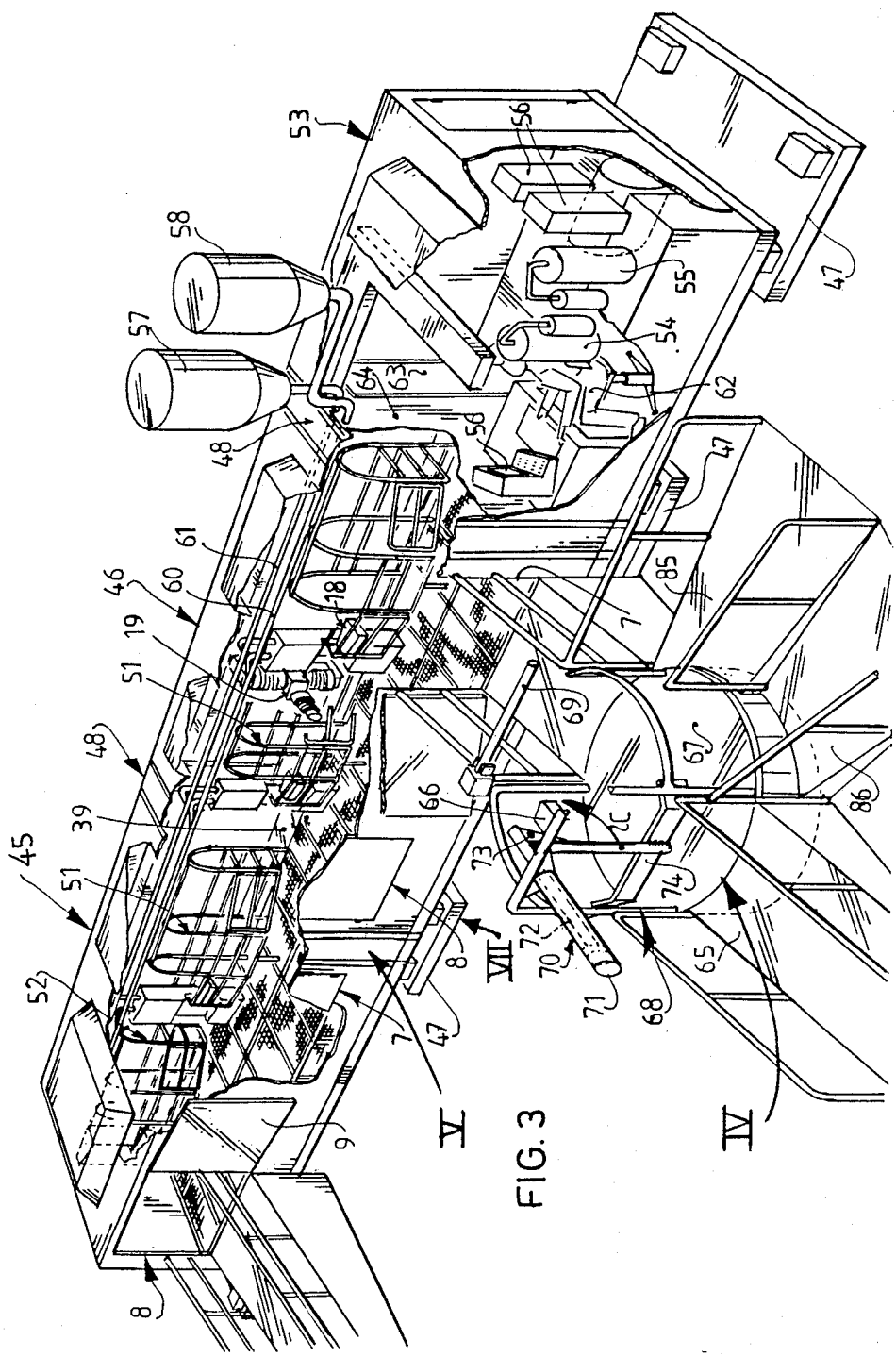
FIG. 3 is a partly broken away perspective view of an embodiment of two milking containers as in FIG. 1 coupled to each other.
Figure 10:
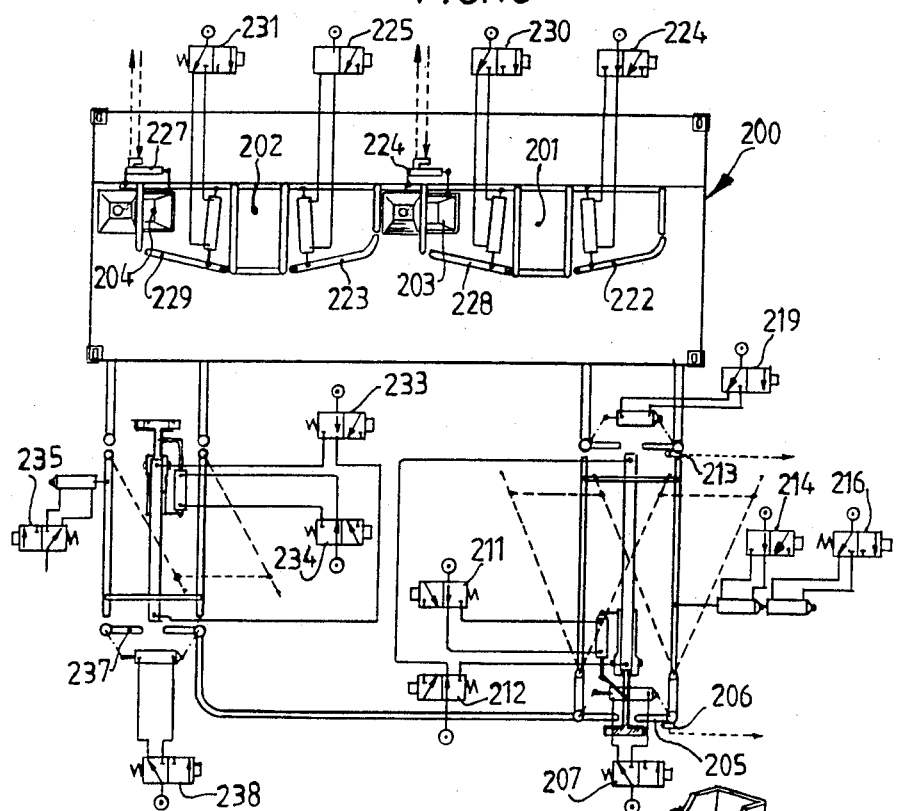
FIG. 10 shows a diagrammatic view of a controlling circuit of the embodiment of FIG. 9.

The containers 1, 45, 46 and 53 in FIGS. 1 and 3 are provided in a generally known manner with corner supports 101 in which are located eyes 102 for lifting, moving and fixing of the containers (see FIG. 1).

The cattle and animals will usually consist of cows, but can of course also consist of other animals, for example goats.

Further features and details of an automatic milking apparatus, in addition to sensor means for connection of the teat cups to the udder of a cow are described in the European patent application Nos. 86.202380.1 and 86.201338.0, the content of which must be regarded as included here. Means for quality control—for instance mastitis detection—and for measuring the amount of milk can thus also be located in the milking area.

Another embodiment of the movable accommodation or container 200 (FIG. 9–12) according to the present invention is also provided with two milking locations 201, 202 resp. at the front of which along arrows $S_1$, $S_2$ resp. are provided slidable feed troughs 203, 204, resp. The feeding is used to lure the cow into her predetermined position, as is known from former recognition of this cow. As the troughs are slidable, the cows will be positioned from the backside, as the udder of a cow is positioned at the backside and so variations for adjusting the milking robot are minimized.

As a cow which would like to be milked arrives at fence 205, she will be automatically recognized at 206 as the cows will wear a responder provided with a code. The receiving unit at 206 is connected to a not shown control unit, which determines whether or not the cow will be allowed into the accommodation 200. After this control unit controls a valve 207 to open through plungers 208 the fence 205 according to arrows T. As soon as the back of the cow has entered fenced passage way 209, a pushing element 210 is lowered by means of valve 211 (controlled by the not shown control unit) and the cow is pushed forward by means of controlling valve 212, which causes pushing element 210 to slide forward. At the same time the cow or other female animal is recognized again at the receiving section 213 and if the cow was milked shortly before, she will be pushed out of the accommodation area by operating valve 214, such that the fencing 215 of passage 209 is turned to the right and the cow will be pushed to an area beside the accommodation, after which valve 214 is switched again and a next cow can be entered into the passage 209 after which the above-described procedure will be repeated.

By means of operating valve 216 the fencing 215 can also be operated to the left, whereas the cow in the passage 209 will be pushed into the area 217. This will be necessary if the cow is suspected to be ill or has to be treated by a veterinarian. She can be led out of this area 217 through a fence 218, e.g., slidable along arrow U.

If the cow is at 213 recognized to enter accommodation 200, valve 219 is operated and the cow enters over a ramp 220 through opening 221 into the accommodation 200. Either fence 222 or 223 will be opened by valve 224 or 225 resp. and the cow will be lured into respecting milking location means of feeding in the trough 203 or 204, which was already adjusted properly by means of actuators 226 and 227 controlled by the controlling unit.

After milking has been done with, fences 228 or 229 can be operated by means of valves 230 or 231, resp., such that the cow will be able to leave the accommodation 200 through opening 230 and via ramp 231, after which she is pushed through passage 232 actuated by valves 233, 234 in the same manner as was described relating to pushing member 210. If the cow is recognized to be sick, e.g. as mastitis has been noted from her milk, she can by means of valve 235 and movable fences 236 be led also into the area 217. If this is not the case she will be led out by opening fence 237 via valve 238.

Figure 11:
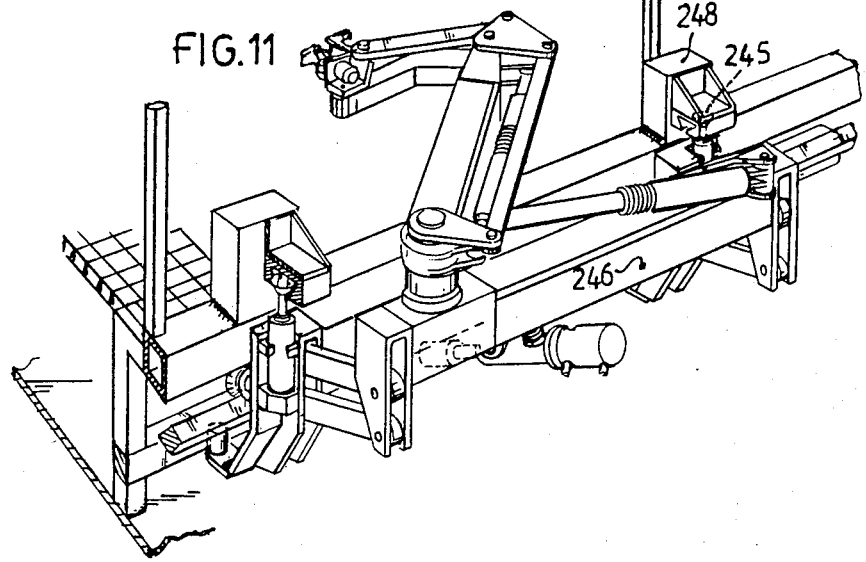
FIG. 11 shows in more detail the robot at the backside of the embodiment of FIG. 9.
Figure 12:
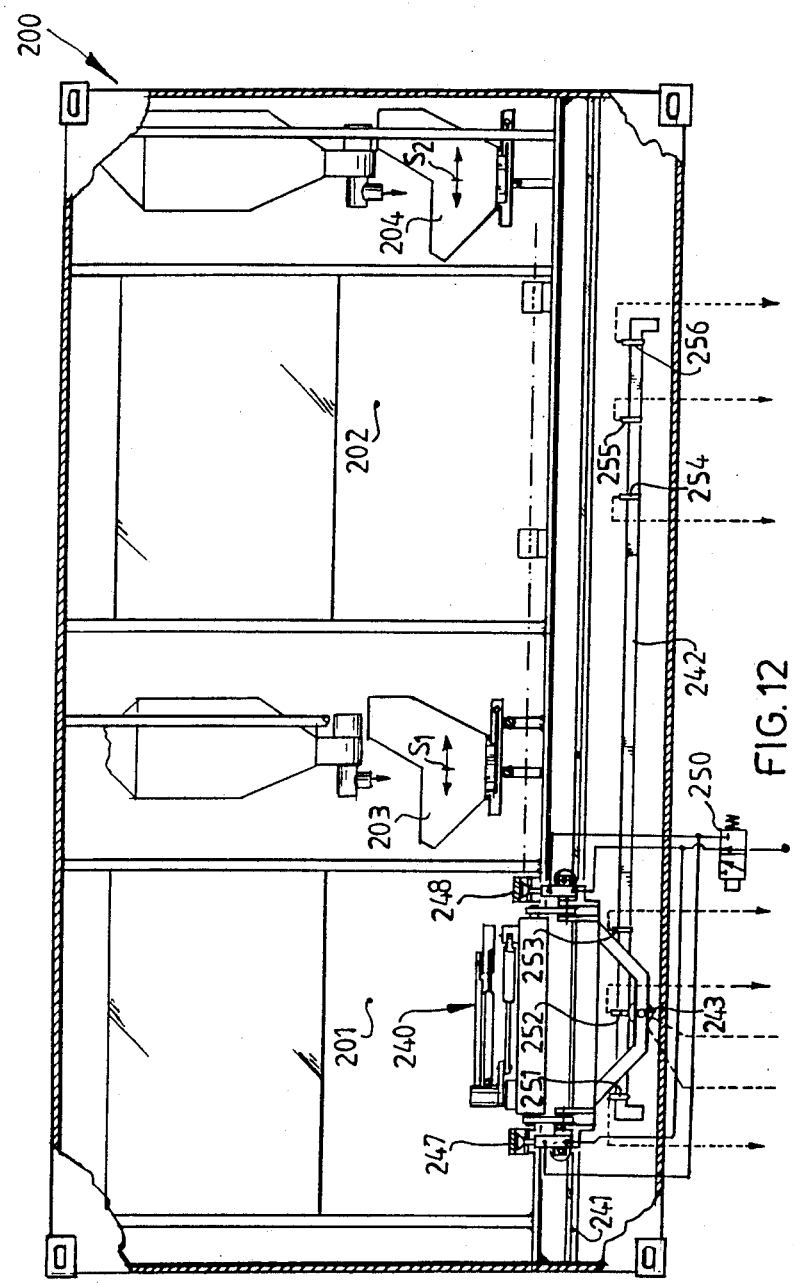
FIG. 12 shows a diagram of one moving of the robot.

As is to be seen from FIG. 9, 11 and 12 at the backside of accommodation 200, a robot mechanism 240 can be moved along a rail 241 and a rail 242 between the two milking locations 201 and 202 by means of a motor 243. Along this rail there are situated two rest positions, one for each milking location, one of which is shown in FIG. 11. When pistons 244 and 245 reach the positions as shown, motor 243 will be disconnected by means of valve 250 (FIG. 12) which causes a rising of bar 246 to which motor 243 is rotatably mounted and spring-loaded, by means of pistons 244 and 245, after which bar 246 will be suspended from supports 247 and 248.

After the bar 246 is suspended, arms of the robot 240 will have a well defined position to find a (not shown) milking rack and to be able to automatically measure the rough position of the cow in the milking position. By means of the adjustment of troughs 203 and 204, the position of the udder of the cow will already by roughly known to the not shown control unit.

On rail 242 there are provided three sensors, e.g. contact or induction switches, for each milking location, numbered 251–256, each connected to the central control unit. Sensors 252 and 255 define the rest positions; sensors 253 and 254 cause slowing down of motor 243; and sensors 251 and 256 cause reversion of the motor 243, if the case may be.

It should be clear that the valves of the above are to be operated with fluid under pressure from a pump.

Apart from what is described and shown in the description and drawings, all known equipment for milking a cow can be incorporated into the accommodation, including required control and proces units. It will be possible to automatically measure the temperature of the teat of a cow, for which purpose a temperature sensor will be included in a milking cup. A sensor for automatically sensing mastistis can be included in the milking line. A quantity meter for measuring the quantity of milk can also be incorporated. Also installations for automatically cleaning and rinsing the equipment, accommodation and/or cows can be incorporated into he shown embodiments.

We claim:

1. A portable milking parlor which comprises the combination of a rigid frame of generally rectangular form and defining a shelter for animals to be milked, an elevated floor for animals to be milked supported by said frame and terminating on one side in spaced relation to a longitudinal side of the frame so as to leave a space for a farmer along such longitudinal side of the frame, fence means extending along said one side of the floor and stationary and movable fence parts cooperating with said fence means to define a longitudinally spaced pair of accessible enclosures to contain the animals to be milked, feed station means in such enclosure for locating the hindquarters of animals to be milked approximately at first and second machine milking stations in the respective enclosures, first support means connected at one end to the fence means alongside said first machine milking station and having a free end for movement toward and away from the fence means, a first milking machine rack connected to the free end of said first support means and including teat cups to receive an animal's teats, second support means connected at one end to the fence means alongside said second machine milking station and having a free end for movement toward and away from the fence means, a second milking machine rack connected to the free end of the second support means and including teat cups to receive an animal's teats, an elongated guide means having opposite ends which is located below said side of said elevated floor and which extends between said first and second milking stations, and robot means movable back and forth along said elongated guide means and between the first and second milking stations for positioning said first and second milk racks with teat cups in alignment with and to receive the teats of animals in said respective enclosures.

2. A movable accommodation according to claim 1, wherein said feed station means include respective feed troughs which are movable towards and away from the respective first and second machine milking stations.

3. A movable accommodation for animals to be milked which comprises in combination:

a shelter for animals having opening means for allowing animals to enter and exit the shelter and an elevated floor for supporting the animals in the shelter, first means for leading an animal to be milked to a first location adjacent a first milking station within the shelter and for confining the animal to said first location, first machine milking means at said first machine milking station for automatic milking of an animal, said first machine milking means including a first milking rack having teat cups, second means for leading an animal to be milked to a second location adjacent to a second milking station within the shelter and for confining the animal to said second location, second machine milking means at said second machine milking station for automatic milking of an animal, said second machine milking means including a second milking rack having teat cups, an elongated guide means having opposite ends which is located below a side of said elevated floor and which extends between said first and second milking stations, and a robot means which is movable back and forth along said elongated guide means and between said first and second milking stations for respectively positioning the milking racks of said first and second machine milking means into operative relation to the teats of a respective animal at said first and second locations.

4. A movable accommodation as defined in claim 3 wherein said side of the elevated floor is spaced from a corresponding side of the shelter to provide a walkway for a farmer below the level of the elevated floor and past the first and second milking stations.

5. A movable accommodation as defined in claim 3 including a second shelter in end-to-end spaced relation to the first mentioned shelter and in end-communication therewith, and a coupling piece interposed between the shelters.

6. A movable accommodation as defined in claim 5 including foundation plates for both shelters and adjustable feet on the foundation plates for supporting said shelters with said coupling piece floating therebetween.

7. A movable accommodation as defined in claim 6 wherein said coupling piece is resilient to accommodate for lack of alignment between the shelters.

8. A movable accommodation as defined in claim 7, including a ramp leading to the opening means, recognition means for recognizing an animal, and lock means along said ramp for either admitting an animal to the shelter or diverting the animal away from the opening means.

* * * * *